No. 768,802. Patented August 30, 1904.

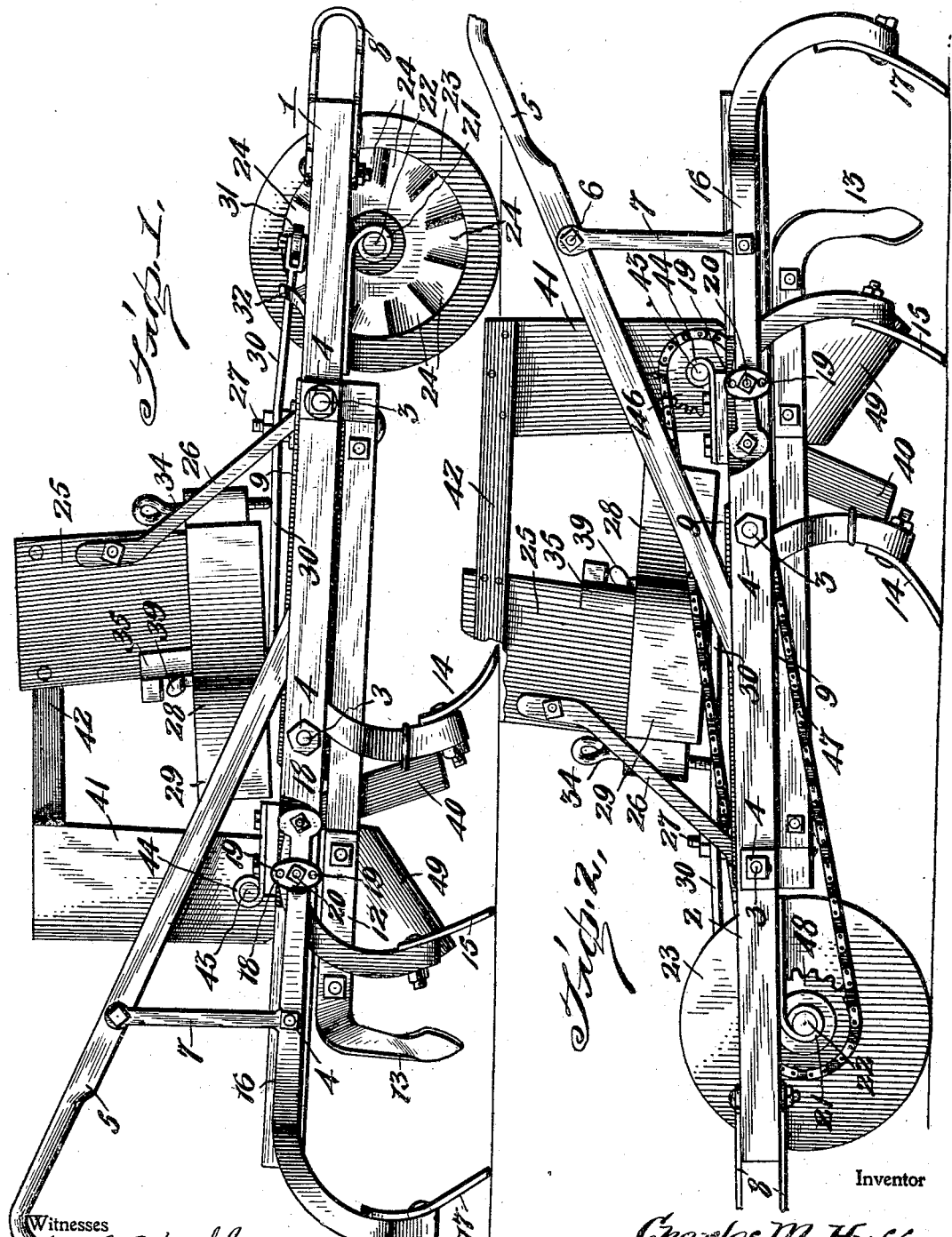

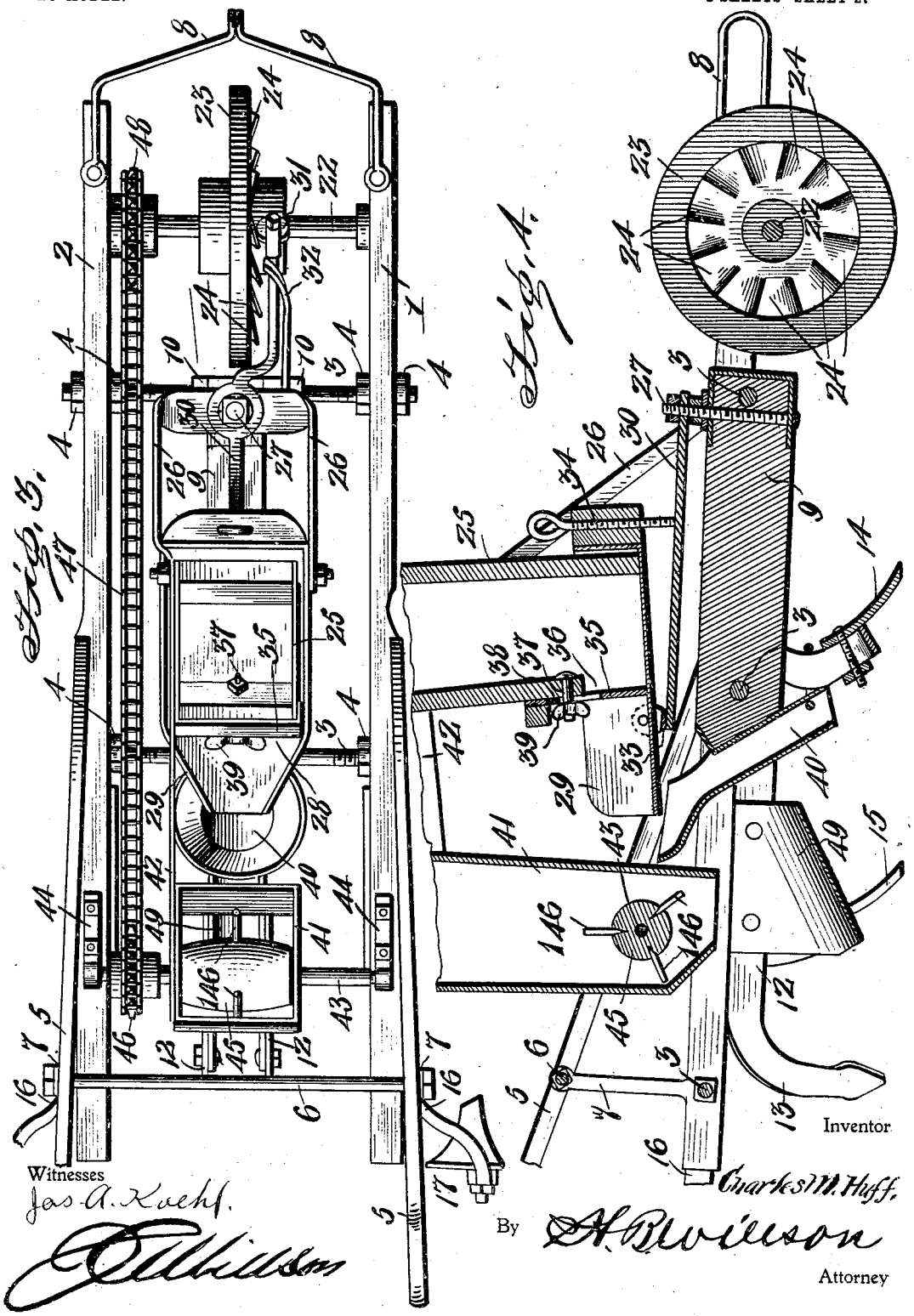

UNITED STATES PATENT OFFICE.

CHARLES M. HUFF, OF WATKINSVILLE, GEORGIA, ASSIGNOR OF ONE-HALF TO E. S. DOBBINS, OF BISHOP, GEORGIA.

COMBINED FERTILIZER-DISTRIBUTER AND COTTON-SEED PLANTER.

SPECIFICATION forming part of Letters Patent No. 768,802, dated August 30, 1904.

Application filed March 10, 1904. Serial No. 197,567. (No model.)

*To all whom it may concern:*

Be it known that I, CHARLES M. HUFF, a citizen of the United States, residing at Watkinsville, in the county of Oconee and State of Georgia, have invented certain new and useful Improvements in a Combined Fertilizer-Distributer and Cotton-Seed Planter; and I do declare the following to be a full, clear, and exact description of the invention, such as will enable others skilled in the art to which it appertains to make and use the same.

This invention relates to improvements in combined fertilizer-distributers and cotton-seed planters.

The object of the invention is to provide a machine of this character which may be quickly arranged for independent use as either a cotton-planter or a fertilizer-distributer or as a combined machine to simultaneously plant seed and distribute fertilizer.

A further object is to provide a machine of this character having a number of plows which are adapted to be variously arranged for different kinds of plowing.

With these and other objects in view the invention consists of certain novel features of construction, combination, and arrangement of parts, as will be more fully described, and particularly pointed out in the appended claims.

In the accompanying drawings, Figure 1 is an elevation of one side of the machine. Fig. 2 is a similar view of the opposite side. Fig. 3 is a top plan view. Fig. 4 is a vertical longitudinal sectional view.

Referring more particularly to the drawings, 1 and 2 denote beams which are disposed substantially parallel with each other and are held together at a suitable distance apart by cross-bolts or threaded rods 3, which are arranged as shown. The ends of the rods or bolts pass through the beams and have pairs of nuts 4 arranged thereon, which are screwed into engagement with each side of the beams 1 and 2, thereby holding them firmly in place. To the beams are secured upwardly and rearwardly projecting handles 5, which are connected near their outer ends by a cross-bar 6 and are supported at this point by upright brace-bars 7. To the forward ends of the beams are pivotally connected inwardly-bent bails 8, to which any suitable draft appliance (not shown) may be connected. Midway between the sides and ends of the beams is arranged a block 9, which is supported by the forward and intermediate rods or bolts 3, which pass through the same, and is held in a central position on said rods by nuts 10, which are screwed up against each side of the block. To each side of the block 9 is bolted rearwardly-projecting arms or bars 12, to the rear ends of which are secured covering blades or shovels 13. To the block 9, near the rear end of the same, are secured the upper ends of the bifurcated standard of a centrally-disposed furrow-opening plow 14.

To the beams 1 and 2 at a point between the plow 14 and shovels 13 are bolted the curved bifurcated standard of listing-plows 15, and to the ends of the beams in rear of the plows 15 are adjustably secured the upper forwardly-bent standards 16 of plows 17. The standards 16 are pivotally mounted on the ends of the rear cross-bolt or rod 3 and are formed on their ends with a head 18, in which is formed a series of holes 19, one of which is engaged by a bolt 20. By means of the holes in the head 18 the standard may be rocked on the bolt 3 to bring any of said holes into engagement with the bolt 20, and thereby tilting the plows 17 to a greater or less degree.

On the lower side of the forward ends of the beams are secured bearings 21, in which are mounted the ends of a tappet-wheel shaft 22, on which is fixedly mounted a ground-wheel 23. On one side of said wheel are formed an annular series of radially-disposed tappet shoulders or notches 24.

Above the block 9 is mounted a fertilizer-hopper 25, which is supported by inclined brace-bars 26, the lower ends of which are secured to a plate which is bolted to the block 9 by a bolt 27. Beneath the hopper is arranged a delivering-shoe 28, which forms the bottom for the hopper. The shoe 28 has a rearwardly-projecting contracted delivery end or mouth 29 and is closed at its forward end and is adjustably supported in an inclined position upon the rear end of a tappet arm or rod 30, which is pivotally mounted on the bolt 27. The forward end of the arm or rod is forked, and in said forked end is journaled a tappet-roller 31, which is adapted to be engaged by the tappet-shoulders 24 on the wheel 23. The roller end of the arm 30 is held in engagement with the shoulders 24 by a spring 32, which is connected to the front cross-bolt 3, as shown.

The arm 33, tappet-rollers 24 of the wheel 23, and the spring 32 coact to vibrate the supporting arm or rod 30 laterally, and hence also correspondingly move the shoe which is carried thereby, the space between the side walls of the shoe being greater than the width of the lower portion of the hopper in the shoe, as shown in Fig. 3, so that the shoe is thus enabled to be moved laterally.

To the rear end of the arm 30 is fixed a cross-bar 33, on the ends of which are formed upwardly-projecting bearing lugs or ears, to which is pivotally connected the rear end of the shoe 28 and by which means said shoe is adjustably supported.

In order that the shoe 28 may be adjusted to change the inclination of the same, adjusting mechanism is provided, which consists of a block secured to the forward end of the shoe and through which is screwed a threaded bolt 34, the upper end of which is provided with a head for turning the same and the lower end of which is adapted to bear on the arm 30, so that by screwing the bolt up or down in the block the spout will be tilted to a greater or less degree.

On the rear side of the fertilizer-hopper 25 is arranged a sliding valve or gate 35, which is adapted to be raised or lowered to open or close the feed-opening 36 in the lower rear side of the hopper. Said gate or valve is held in its adjusted positions by means of a bolt 37, which projects from the side of the hopper and passes through a slot 38 in the valve and is engaged by a thumb-nut 39, which is screwed up against the valve and clamps the same against the side of the hopper.

To the rear end of the block 9 is secured a discharge-tube 40, the upper flared end of which is disposed immediately below the delivery end of the shoe 28 to permit the contents of the shoe to be shaken into said flaring end. The lower end of the tube is secured to the rear side of the central plow-standard and is arranged to drop the fertilizer into the furrow opened by said plow.

In rear of the fertilizer-hopper is arranged a seed-hopper 41, which is connected at its upper end to the fertilizer-hopper by a brace-bar 42 and is supported at its lower end upon a shaft 43, the reduced ends of which are journaled in bearings 44 on the beams 1 and 2. On the shaft 43 within the hopper is fixed a roller 45, on which is arranged a series of radially-disposed agitator-fingers 46. On the shaft 43 between the hopper and the beam 2 is fixed a sprocket-wheel 146, which is connected by a chain 47 to a sprocket-wheel 48, fixed on the shaft 22 of the tappet-wheel, whereby the shaft 43 and roller 45, carrying the agitator-blades, is driven.

Between the rearwardly-projecting arms 12 is fixed a triangularly-shaped discharge-spout or chute 49, the rear and upper ends of which are open. Said upper open end is arranged immediately below the lower end of the seed-hopper, so that the seed will drop from the hopper into the discharge-spout and will be conducted and discharged thereby into the furrow.

While the machine is here shown and described as a combined fertilizer-distributer and planter, it is obvious that the same may be readily transformed and arranged for use either as a fertilizer-distributer or a planter or that both the fertilizer-distributing and the planting mechanism may be removed and the machine used as a plow, and by a different disposition of the plows the machine may be used for various kinds of plowing or cultivating.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the class described, the combination of a bottomless fixed hopper having a discharge-regulating gate in its rear side, a supporting and shaking element under and spaced below the hopper, a shoe forming the bottom of the hopper, pivotally mounted at a point between its ends, on said element, for vertical angular movement and adjustment to any required inclination, and means coacting with the supporting element and the said shoe to adjust the latter.

2. In a machine of the class described, the combination of a bottomless fixed hopper having a discharge-regulating gate in its rear side, a supporting and shaking element under and spaced below the hopper, a rearwardly-inclined shoe, forming the bottom of the hopper, supported by and movable with the supporting and shaking element and pivotally mounted thereon for vertical angular adjustment, and an adjusting-screw carried by the shoe and engaging the supporting and shaking element, for adjusting the former.

3. In a machine of the class described, a frame comprising side beams, cross-bars, connecting them together, a block between the said beams, and supported by said bars, a discharge-tube secured to the rear end of said block, brace-bars secured to the front end of said block, extending upwardly therefrom and also extending rearwardly beyond the rear end thereof, a bottomless fertilizer-hopper secured to said bars and supported thereby above and spaced from said block, and having a discharge-regulating gate in its rear side, a laterally-movable arm pivotally mounted on said block, a shoe, forming the bottom of the fertilizer-hopper, pivotally mounted on said arm for rearward inclination, and having its rear end disposed to discharge into the discharge-tube, means, coacting with said arm to adjust said shoe, a seeding device in rear of the fertilizer-hopper, and supported by the rearwardly-extending brace-bars, a ground-wheel with which the frame is provided, and means, operated by said ground-wheel, to operate the laterally-movable pivoted arm and to operate the seeding mechanism.

In testimony whereof I have hereunto set my hand in presence of two subscribing witnesses.

CHARLES M. HUFF.

Witnesses:
JAS. W. JACKSON,
CHAS. A. DUGGAN.